(12) United States Patent
Terwilliger et al.

(10) Patent No.: US 12,679,553 B2
(45) Date of Patent: Jul. 14, 2026

(54) CRYOGENIC FUEL BOIL OFF POWERED FUEL CELL

(71) Applicant: Raytheon Technologies Corporation, Farmington, CT (US)

(72) Inventors: Neil J. Terwilliger, Cheshire, CT (US); Marc J. Muldoon, Marlborough, CT (US)

(73) Assignee: RTX CORPORATION, Farmington, CT (US)

( * ) Notice: Subject to any disclaimer, the term of this patent is extended or adjusted under 35 U.S.C. 154(b) by 755 days.

(21) Appl. No.: 18/102,164

(22) Filed: Jan. 27, 2023

(65) Prior Publication Data

US 2024/0253806 A1     Aug. 1, 2024

(51) Int. Cl.
　*H02J 7/00*　　　(2026.01)
　*B64D 37/30*　　　(2006.01)
　*B64D 41/00*　　　(2006.01)

(52) U.S. Cl.
　CPC ........ B64D 37/30 (2013.01); B64D 2041/005 (2013.01); B64D 2221/00 (2013.01)

(58) Field of Classification Search
　CPC .............. B64D 37/30; B64D 2041/005; B64D 2221/00; Y02T 90/40
　USPC .................................... 320/101, 109; 701/22
　See application file for complete search history.

(56) References Cited

U.S. PATENT DOCUMENTS

| | | | |
|---|---|---|---|
| 9,255,664 B2 | 2/2016 | Gerstler et al. | |
| 9,701,416 B2 | 7/2017 | Epstein et al. | |
| 10,006,363 B2 | 6/2018 | Delgado, Jr. et al. | |
| 10,184,614 B2 | 1/2019 | Epstein et al. | |
| 10,630,082 B1* | 4/2020 | Gu ........................ | H02J 7/0048 |
| 2014/0023945 A1 | 1/2014 | Epstein et al. | |
| 2014/0174083 A1* | 6/2014 | Gerstler ................... | F17C 9/04 |
| | | | 60/671 |
| 2015/0017557 A1* | 1/2015 | Hoffjann ................. | A62C 3/08 |
| | | | 429/410 |
| 2016/0025339 A1 | 1/2016 | Kamath et al. | |
| 2021/0316877 A1 | 10/2021 | Rheaume et al. | |

OTHER PUBLICATIONS

Extended European Search Report for European Application No. 24154532.6 mailed May 28, 2024.

* cited by examiner

*Primary Examiner* — Zixuan Zhou
(74) *Attorney, Agent, or Firm* — Carlson, Gaskey & Olds, P.C.

(57)　　　　　　ABSTRACT

A cryogenic fueled aircraft propulsion system includes a core engine where fuel is mixed with compressed air and ignited to generate a high energy exhaust gas flow, a fuel system that is configured to supply the fuel to the core engine, a cryogenic fuel tank for storing fuel cryogenically in a liquid phase, a gas collection system where boil off gas from the fuel system is collected, a fuel cell system where a flow of collected boil off gas is utilized to generate electric power, and an electrical coupling where electric power generated by the fuel cell is communicated to location outside of the aircraft.

15 Claims, 2 Drawing Sheets

CRYOGENIC FUEL BOIL OFF POWERED FUEL CELL

TECHNICAL FIELD

The present disclosure relates generally to an alternate fuel turbine engine for aircraft and more specifically to a system and means for utilizing gaseous fuel boil off during times of aircraft inactivity.

BACKGROUND

Reduction and/or elimination of carbon emissions generated by aircraft operation is a stated goal of aircraft manufacturers and airline operators. Alternate fuels have been proposed including ammonia and hydrogen. Some alternate fuels require storage at temperatures well below ambient conditions to maintain them in a liquid form. Accordingly, aircraft will include operating systems that provide the required pressures and temperatures to maintain the fuel in a desired phase or to use excess boil-off during flight operation. However, during periods where the aircraft is not operating, such, as during loading of passengers or extended layovers, some boil off of the fuels may still occur. The boil off can be significant and result in substantial fuel loss that incur additional costs.

Turbine engine manufacturers continue to seek further improvements to engine performance including improvements to reduce environmental impact while improving propulsive efficiencies.

SUMMARY

A cryogenic fueled aircraft propulsion system according to an exemplary embodiment of this disclosure, among other possible things includes a core engine where fuel is mixed with compressed air and ignited to generate a high energy exhaust gas flow, a fuel system configured to supply the fuel to the core engine, a cryogenic fuel tank for storing the fuel cryogenically in a liquid phase, a gas collection system where boil off gas from the fuel system is collected, a fuel cell system where a flow of collected boil off gas is utilized to generate electric power, and a controller programmed to control generation of electric power by the fuel cell.

In a further embodiment of the foregoing aircraft propulsion system, the controller is further programmed to communicate power to a location outside of the aircraft.

In a further embodiment of any of the foregoing aircraft propulsion systems, the aircraft includes a battery system and the controller is programmed to direct electric power to charge the battery system.

In a further embodiment of any of the foregoing aircraft propulsion systems, the controller is further programmed to communicate electric power to a ground based electrical system in response to the amount of electric power generated by the fuel cell exceeding a predefined amount.

In a further embodiment of any of the foregoing aircraft propulsion systems, the fuel system includes a fuel liquification system for transforming collected gaseous phase cryogenic fuel into liquid phase.

In a further embodiment of any of the foregoing aircraft propulsion systems, the controller is programmed to operate the fuel cell when the core engine is not operating and the aircraft is parked.

An electric power generation system for an aircraft according to another exemplary embodiment of this disclosure includes, among other possible things, a fuel system configured to supply fuel to a core engine, a cryogenic fuel tank for storing the fuel cryogenically in a liquid phase, a gas collection system where boil off gas from the fuel system is collected, a fuel cell where a flow of collected boil off gas is utilized to generate electric power, and a controller programmed for controlling operation of the fuel cell and communication of electric power.

In a further embodiment of the foregoing electric power generation system, an electrical coupling is provided for communicating electric power generated from the fuel cell to a ground based electrical system during periods of aircraft inactivity.

In a further embodiment of any of the foregoing electric power generation systems, the controller is programmed to communicate electric power to the ground based electrical system when a demand for electric power by the aircraft is below a predefined amount.

In a further embodiment of any of the foregoing electric power generation systems, the controller is programed to control fuel flow to the fuel cell based at least in part on a sensed pressure in at least one of the cryogenic fuel tank and the fuel system.

In a further embodiment of any of the foregoing electric power generation systems, a passage for communicating oxygen to the fuel cell is included.

In a further embodiment of any of the foregoing electric power generation systems, gaseous fuel exhausted from the fuel cell is communicated to a fuel liquification system onboard the aircraft.

In a further embodiment of any of the foregoing electric power generation systems, the fuel cell system is electrically coupled to at least partially power the fuel liquification system onboard the aircraft.

A method of generating electric power during periods of aircraft inactivity using boil off gas from a cryogenic fuel system according to another exemplary embodiment of this disclosure includes, among other possible things, collecting boil off gases from an aircraft cryogenic fuel system, directing the collected boil off gases to a fuel cell onboard the aircraft when the aircraft is inactive, generating electric power with a fuel cell and a flow of the collected boil off gases, and directing the generated electric power to electrical device.

A further embodiment of the foregoing method further includes directing the generated electric power to a ground based electrical system in response to a power demand of the aircraft being below a predefined amount.

A further embodiment of any of the foregoing methods includes communicating an oxygen flow to the fuel cell through a passage in the aircraft.

A further embodiment of any of the foregoing methods includes directing electric power to an aircraft battery system to charge the aircraft battery system to a predefined level.

A further embodiment of any of the foregoing methods includes automatically generating electric power with the fuel cell in response to the aircraft being inactive and being electrically coupled to the ground based electrical system.

A further embodiment of any of the foregoing methods includes directing a portion of the generated electric power to operate a fuel liquification system located onboard the aircraft.

A further embodiment of any of the foregoing methods includes powering at least one aircraft system with electric power produced by the fuel cell.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
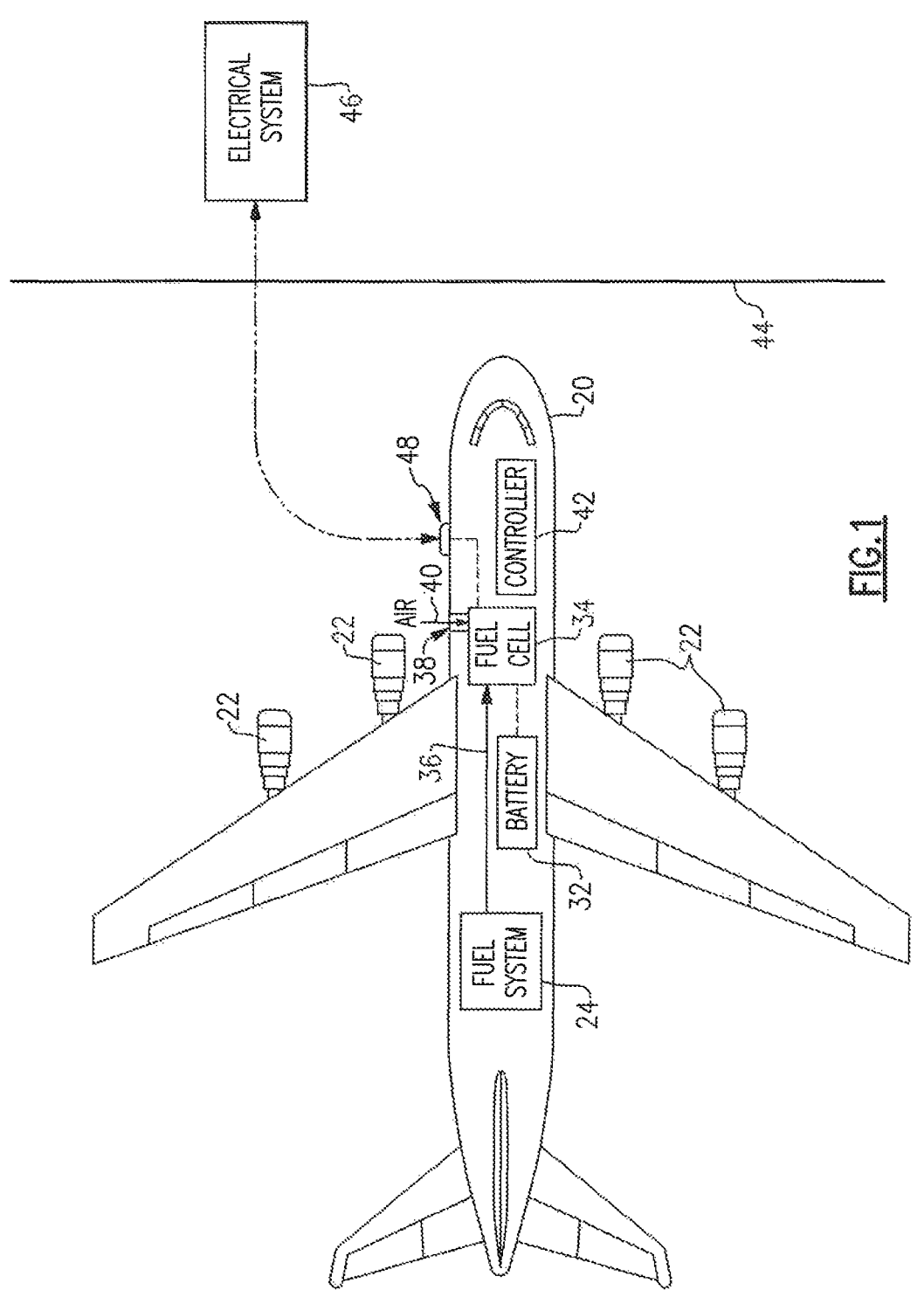
FIG. 1 is a schematic view of a schematic view of an example aircraft sitting idle at a gate.

FIG. 1 schematically illustrates an aircraft 20 parked at a gate 44 or other aircraft parking area. The aircraft 20 includes engines 22 that utilize non-carbon based fuels to generate power. The aircraft 20 includes a fuel cell system 34 for generating electric power from boil off gases while the aircraft 20 is sitting idle at the airport gate 44 or other aircraft parking area.

The replacement of hydrocarbon fuels with alternate fuels such as hydrogen provide a potential for significant reduction of carbon emissions. However, most alternate fuels exist in a gaseous phase at typical ambient pressures and temperatures. Accordingly, low temperatures are required for storage in a liquid phase. Such cryogenic fuels are stored in a liquid phase on-board the aircraft 20.

Maintaining the cryogenic fuel in liquid form requires systems to maintain temperatures well below ambient temperatures. Even with such cryogenic systems, some amount of the liquid fuel changes phase into a gaseous form during aircraft operation. An aircraft fuel system 24 distributes fuel to the engines 22 and includes features that accommodate and use the gaseous fuel during aircraft operation. However, when the aircraft is not operating such as during passenger loading and unloading and/or extended period of down time at a gate 44 or other aircraft parking area, the cryogenic fuel will continue to boil off at some rate. Depending on ambient conditions and the duration of the down time, losses of fuel due to transformation of the liquid fuel to gaseous form can be significant and represents both an economic and performance loss. However, the example disclosed aircraft 20 includes a fuel cell system 34 that uses a flow of the boil off gas 36 to generate electric energy that can be used aboard the aircraft or communicate electric power to a land based electrical system 46.

Figure 2:
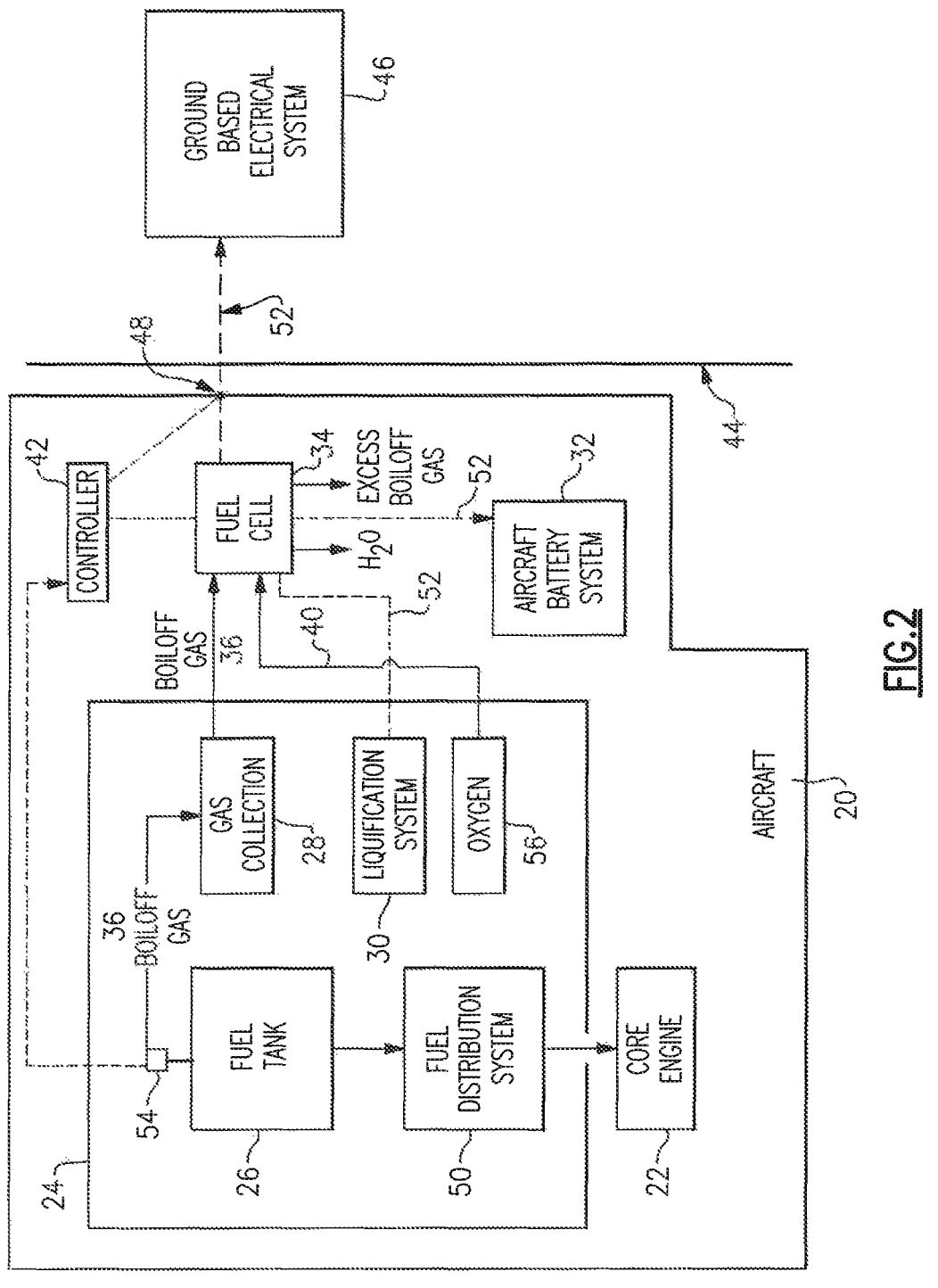
FIG. 2 is a schematic view of the example aircraft including a fuel cell for generating electric power during aircraft inactivity.

Referring to FIG. 2, with continued reference to FIG. 1, the example aircraft 20 includes cryogenic fueled turbine engines 22. A fuel system 32 distributes cryogenic fuel to each of the engines 22. A cryogenic fuel as explained by example in this disclosure describes a fuel that is stored at temperatures much lower than ambient conditions. In one example embodiment, the cryogenic fuel is hydrogen-based fuel. The hydrogen-based fuel may be hydrogen and/or be derived from hydrogen containing compounds such as ammonia. It should be appreciated that although hydrogen and ammonia are disclosed by way of example, other cryogenic fuels are within the scope and contemplation of this disclosure.

A cryogenic fuel tank 26 stores fuel onboard the aircraft 20 in liquid form. Cryogenic fuels such as hydrogen and/or ammonia are liquid at temperatures well below ambient conditions. Accordingly, the cryogenic fuel tank 20 is configured to maintain the cryogenic fuel at temperatures and pressures that maintain the fuel in the liquid phase. The liquid fuel communicated to the engines 22 through a fuel distribution system 50 and is typically heated to gaseous phase prior to combustion. Additionally, the cryogenic fuel can be utilized as a cooling medium for other engine and/or aircraft systems and therefore may change phase during typical engine operation.

Because the cryogenic fuel is a gas at ambient temperatures, some of the liquid fuel will boil off and transform into a gaseous phase. The example fuel system 24 includes a gas collection system 28 that collects the boil off gas and routes it to eventually be utilized in the combustion process during engine operation. However, when the engines 22 are not operating, such as for passenger loading and unloading and other extended periods of inactivity, the collected gas does not have a use and can build up. Exhausting the boil off gas to atmosphere is not a desirable option as the boil off gas can, over time, be substantial and result in a significant loss of fuel.

The example aircraft 20 includes the fuel cell system 34 that uses boil off gas flow 36 and a flow containing oxygen 40 to generate electric power schematically indicated at 52. The oxygen 40 may be communicated from a storage tank 56 on the aircraft 20 are drawn from other sources such as the ambient environment. The example fuel cell system 34 is shown schematically and may include thermal management devices, fuel pumps, oxygen storage conduits, turbo-expanders and any other devices utilized to efficiently generate power from the fuel cell system 34. Moreover, the fuel system 24 includes features for providing the fuel cell system 34 a flow of fuel separate from, or combined with the boil off gas flow 36 to facilitate electric power generation.

The fuel cell system 34 communicates electric power through an electrical coupling 48 to a ground based electrical system 46. The electrical coupling 48 is configured to selectively communicate electric power between the aircraft fuel cell system 34 and the ground based electrical system 46 according to predefined criteria. The predefined criteria may include an amount of electric power generated by the fuel cell system 34 exceeding a predefined threshold, a demand for electric power by the aircraft being below a threshold amount, a battery charge of an aircraft battery exceeding a threshold amount, and/or the like.

A controller 42 onboard the aircraft 20 is programmed to operate the fuel cell system 34 to communicate electric power through the coupling 48 to the ground based electrical system 46. The controller 42 is further programmed to communicate electric power 52 to aircraft systems such as for charging an aircraft battery system 32. Additionally, electric power 52 can be utilized to power a liquification system 30 that transforms the boil off gas back to a liquid form.

The example controller 42 is a device and system for performing necessary computing or calculation operations. The example controller 42 may be specially constructed for this purpose, or it may comprise at least a general-purpose computer selectively activated or reconfigured by a computer program stored in the computer. The controller 42 may further be a dedicated to power generation by the fuel cell, or may be a program stored on an engine or aircraft controller.

The controller 42 may include a computer program directing operation. Such a computer program and also data required for its execution may be stored in a computer readable storage medium, such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. Furthermore, the computer referred to may include a single processor or may be architectures employing multiple processor designs for increased computing capability.

The example fuel cell system 34 uses the boil off gas flow 36 and an oxygen flow 40 to generate electric power 52. The fuel cell system 34 outputs water and any remaining unreacted boil off gas flow. The water can be exhausted overboard or maintained onboard the aircraft for other uses. The unreacted boil off gas flow may be communicated to the liquification system 50 for transformation into liquid phase followed by subsequent storage in the fuel tank 26.

In one operational example embodiment, the aircraft 20 is parked at the gate 44 (or other aircraft parking area) and the engines 22 are turned off such that the aircraft 20 sits idle. In the inactive idle condition, the engines 22 do not use of any of the boil off gas. However, some percentage of the liquid fuel will boil off regardless of the operating condition of the aircraft 20. Depending on the ambient conditions and duration of inactivity, a substantial amount of fuel can be loss as boil off gas.

In this example embodiment, in response to aircraft 20 inactivity, the fuel cell system 34 is operated to generate electric energy 52. The fuel cell system 34 may sit idle until a flow of boil of gas is sufficient for operation. A threshold amount of boil off gas 36 can be determined utilizing a sensor 54. The sensor 54 may provide information indicative or a pressure of boil off gases 36 to the controller 42. Although the sensor 54 is described by way of example as providing information indicative of pressure, other sensing devices and criteria may be utilized to indicate the presence of a threshold amount of boil off gas 36 within the contemplation and scope of this disclosure.

A flow air including oxygen 40 is provided through a passage 38 in the aircraft 20 (illustrated in FIG. 1). Once the amount of boil off gas is sufficient to produce electric power, the fuel cell system 34 is operated and produces electric power 52. The generated electric power 52 can be used to charge a battery system 32 onboard the aircraft and to power aircraft systems. Moreover, the electric energy 52 may be utilized to power aircraft systems, including but not limited to anti-ice systems, environmental control systems, or any other system that utilizes electric power.

In one disclosed embodiment, the aircraft includes the liquification system 30 that provides for transformation of gaseous phase fuel back into a liquid phase fuel. The controller 42 may be programmed to control the flow of the generated electric power through the electrical coupling 48.

Once any aircraft power requirements are met, any additional electric power is communicated to the ground based electrical system 46. The electric power communicated to the ground based system 46 can be used to power ground based devices or simply may be communicated to a municipal power grid to contribute electrical power. Accordingly, the fuel cell system 34 may, in some instances, operate similar to the contribution of electric energy provided by residential solar panels when power is not immediately needed at a residence. In one disclosed embodiment, the fuel cell system 34 generates electricity and directs any produced power directly to the ground based electrical system 46. The contribution of electric power to the ground based power system 46 reduces the amount of power needed to be supplied by a municipal power system.

Accordingly, the example aircraft fuel cell system 34 turns an otherwise wasted boil of gas flow into useful electric energy that can power aircraft systems or contribute electrical energy to a land based power grid.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A cryogenic fueled aircraft propulsion system comprising:

a core engine where fuel is mixed with compressed air and ignited to generate a high energy exhaust gas flow;

a fuel system configured to supply the fuel to the core engine;

a cryogenic fuel tank for storing the fuel cryogenically in a liquid phase;

a gas collection system where boil off gas from the fuel system is collected;

a fuel cell system where a flow of collected boil off gas is utilized to generate electric power; and a controller programmed to control generation of electric power by the fuel cell, wherein the controller is further programmed to communicate the electric power to a location outside of an aircraft including the fuel cell system.

2. The cryogenic fueled aircraft propulsion system as recited in claim 1, wherein the aircraft includes a battery system and the controller is programmed to direct electric power to charge the battery system.

3. The cryogenic fueled aircraft propulsion system as recited in claim 1, wherein the controller is further programmed to communicate electric power to a ground based electrical system in response to the amount of electric power generated by the fuel cell exceeding a predefined amount.

4. The cryogenic fuel aircraft propulsion system as recited in claim 1, wherein the fuel system includes a fuel liquification system for transforming collected gaseous phase cryogenic fuel into liquid phase.

5. The cryogenic fuel aircraft propulsion system as recited in claim 1, wherein the controller is programmed to operate the fuel cell when the core engine is not operating and the aircraft is parked.

6. An electric power generation system for an aircraft comprising:

a fuel system configured to supply fuel to a core engine;

a cryogenic fuel tank for storing the fuel cryogenically in a liquid phase;

a gas collection system where boil off gas from the fuel system is collected;

a fuel cell where a flow of collected boil off gas is utilized to generate electric power;

a battery system electrically coupled to the fuel cell;

an electrical coupling for communicating electric power generated from the fuel cell to a ground based electrical system during periods of aircraft inactivity; and a controller programmed for controlling operation of the fuel cell and communication of electric power generated in the fuel cell, wherein operation the controller is programmed to charge the battery system with electric power generated by the fuel cell and to communicate electric power to the ground based electrical system when a demand for electric power by the aircraft is below a predefined amount.

7. The electric power generation system as recited in claim 6, wherein the controller is programed to control fuel flow to the fuel cell based at least in part on a sensed pressure in at least one of the cryogenic fuel tank and the fuel system.

8. The electric power generation system as recited in claim 6, including a passage for communicating oxygen to the fuel cell.

9. The electric power generation system as recited in claim 6, wherein gaseous fuel exhausted from the fuel cell is communicated to a fuel liquification system onboard the aircraft.

10. The electric power generation system as recited in claim 9, wherein the fuel cell system is electrically coupled to at least partially power the fuel liquification system onboard the aircraft.

11. A method of generating electric power during periods of aircraft inactivity using boil off gas from a cryogenic fuel system, the method comprising:

collecting boil off gases from an aircraft cryogenic fuel system;

directing the collected boil off gases to a fuel cell onboard the aircraft when the aircraft is inactive;

generating electric power with a fuel cell and a flow of the collected boil off gases;

directing the generated electric power to an electrical device, wherein at least a portion of electric power is directed to an aircraft battery system to charge the aircraft battery system to a predefined level; and directing the generated electric power to a ground based electrical system in response to a power demand of the aircraft being below a predefined amount.

12. The method as recited in claim 11, including communicating an oxygen flow to the fuel cell through a passage in the aircraft.

13. The method as recited in claim 11, including automatically generating electric power with the fuel cell in response to the aircraft being inactive and being electrically coupled to the ground based electrical system.

14. The method as recited in claim 11, including directing a portion of the generated electric power to operate a fuel liquification system located onboard the aircraft.

15. The method as recited in claim 11, further comprising powering at least one aircraft system with electric power produced by the fuel cell.

* * * * *